April 21, 1953  L. BACA  2,635,280
HEAT DISSIPATING HANDLE
Filed July 15, 1950
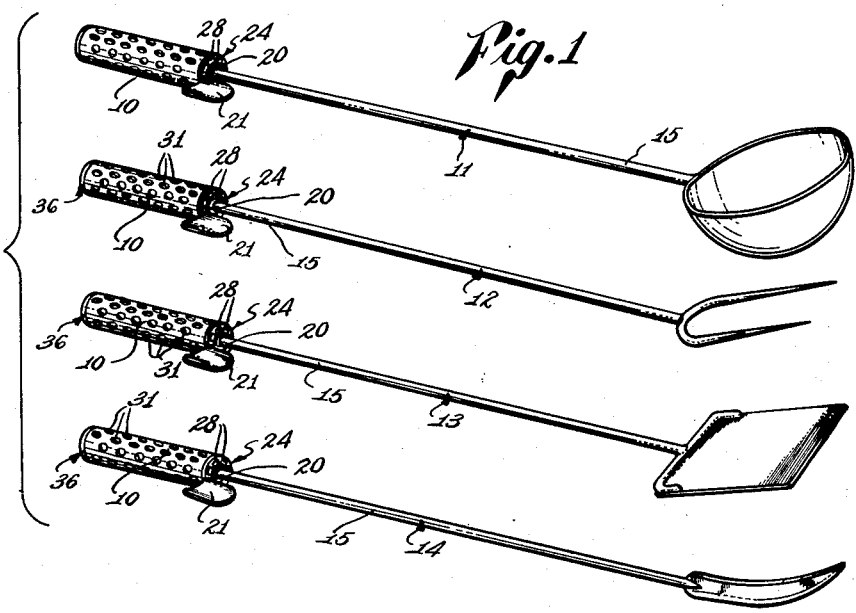
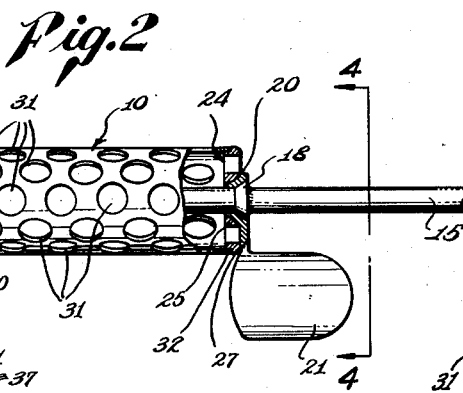
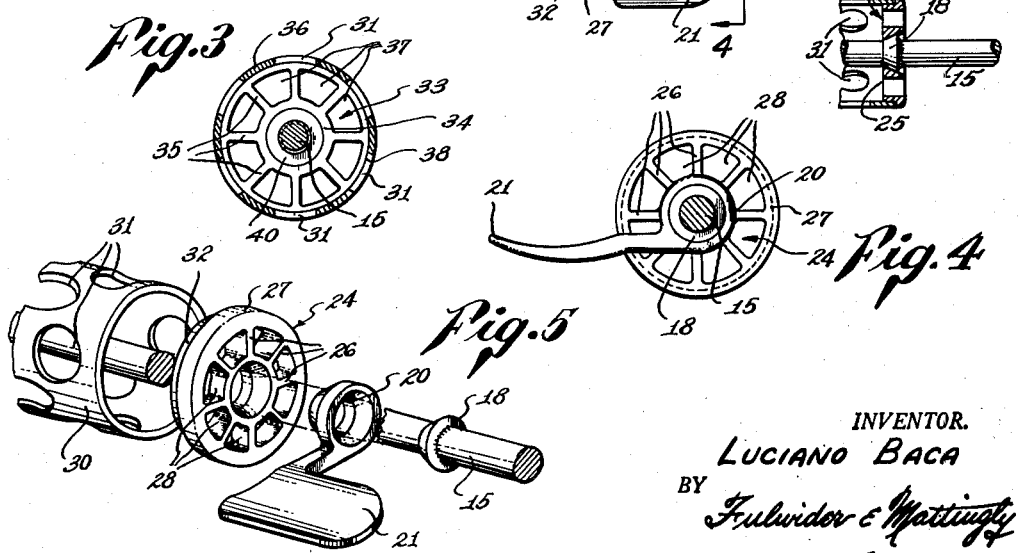
INVENTOR.
LUCIANO BACA
BY
Fulwider & Mattingly
Attorneys Patented Apr. 21, 1953

2,635,280

UNITED STATES PATENT OFFICE 2,635,280

HEAT DISSIPATING HANDLE

Luciano Baca, Ventura, Calif.

Application July 15, 1950, Serial No. 173,994

4 Claims. (Cl. 16—116)

My invention relates generally to utensils and more particularly to an improved heat dissipating handle for use on barbecue tools or the like.

Barbecue tools are often subjected to intense heat for relatively long periods of time, and are used under open flame conditions that produce considerable soot and carbon. In addition, grease may splatter from the food cooked, and form with such soot and carbon a hard coating which is difficult to remove. The tools must necessarily be provided with handles which will remain relatively cool, and it is desirable that the handles be easily detachable for cleaning purposes. Conventional handles of heat-insulating materials, such as wood or plastic, are unsatisfactory because they are quickly charred and scorched by the open flames. Furthermore, such prior handles are not adapted for convenient detachment, nor are they sufficiently durable to withstand rough usage.

It is therefore a major object of my invention to provide a heat dissipating and flame-resisting handle adapted for rigid attachment to a cooking utensil.

Another object of my invention is to provide a conveniently detachable handle which may be economically manufactured.

It is also an object of my invention to provide a handle having longitudinal and peripheral vent openings disposed so as to allow a maximum circulation of cooling air.

A further object of my invention is to provide a handle which is rigidly supported by mounting means having a minimum surface contact with the utensil shank, and a grip area spaced substantially therefrom.

Still another object of my invention is to provide a detachable handle which is sufficiently rigid to withstand the severe bending stresses which are created by the use of an elongated tool.

Yet another object of my invention is to provide a detachable handle having a minimum number of interchangeable elements that interlock together and may be assembled as a unit together with a suitable thumb rest.

These and other objects and advantages of my invention will become apparent from the following detailed description of a preferred form thereof, and from an inspection of the accompanying drawings, in which:

Fig. 1 is a perspective view of a set of barbecue tools fitted with a preferred form of my improved handle structure;

Fig. 2 is a plan view of the handle partially in section;

Fig. 3 is a cross-section taken along the line 3—3 of Fig. 2;

Fig. 4 is a cross-section taken along the line 4—4 of Fig. 2;

Fig. 5 is an exploded view of the forward handle mounting means; and

Fig. 6 is a detail showing the assembly of the handle without the thumb rest.

Referring now to the drawings, and particularly to Fig. 1 thereof, a preferred embodiment of the handle is designated generally by the numeral 10. A plurality of similar handles 10 are shown fitted to the individual tools of a barbecue set, which comprises, a cooking spoon or dipper 11, a fork 12, turner 13, and knife 14. Each of the tools 11 to 14 has an elongated shank 15 welded or otherwise rigidly attached to the working portion of the tool. The working portions of the tools 11 to 14 are inclined upwardly from the axis of the shank 15 through a suitable angle, and are of substantial size. The shape of the tools shown is highly practical for this type of cooking, but as can be understood, considerable modification is possible. Likewise, it can be understood that the invention is not restricted to the class of utensils shown, but may be used on pots, pans, or other devices subjected to the aforementioned heat and flame conditions.

The handles 10 are removably mounted on the rear or outer ends of the shanks 15. The tip of each shank 15 carries a threaded portion 17, as is best seen in Fig. 2, and a collar means 18 spaced inwardly a distance approximately equal to the length of the handle 10. The collar means 18 forms an abutment preventing forward motion of the handle structure, and is preferably formed as an outwardly convergent shoulder or ring welded to the shank 15. Adjacent the collar 18 is a conical sleeve 20 which supports a laterally offset thumb rest 21. The sleeve 20 is adapted to fit over the shank 15 and slide against the collar 18, the taper of the sleeve being the same as that of the collar so as to wedge frictionally thereon. The outer or body portion of the thumb rest 21 is formed as a dished arcuate plate disposed substantially parallel to the axis of the shank 15, as is seen in Figs. 2 and 4.

A front support or spider 24 is fitted on the shank 15 outward of the sleeve 20. The central portion of the spider 24 is formed as a hub 25 which carries a plurality of radial spokes 26. A peripheral rim 27 bounds the spokes 26 and defines therewith spaced longitudinal apertures or air vents 28. The spokes 26 are of minimum structural width to restrict heat conduction, and the apertures 28 are designed to provide a free circulation of air. The hub 25 is tapered on its inner face to seat firmly against the sleeve 20 and hold the spokes 26 in radial alignment with the shank 15.

On some classes of utensils the thumb rest 21 may not be used, in which case the hub 25 will seat firmly against the collar 18 without any modification of the structure. As can be understood, this simplifies the production of parts for handles to be used on different kinds of utensils.

A gripping surface or body member 30 is formed as a perforated shell which is adapted to concentrically surround the shank 15. A substantial number of perforations 31 are spaced over the surface of the shell 30, and cooperate with the vent openings 28 to provide a flow path for circulation of cooling air through the device. The shell 30 is preferably formed of a flame and corrosion resistant metal which may be easily cleaned. The forward edge of the shell 30 seats against the rim 27 formed on the spider 24 and is thus held spaced from the shank 15. An annular shoulder 32 is cut into the edge of the rim 27 to receive the leading edge of the shell 30 and hold the shell properly spaced from the shank 15, while at the same time preventing any rearward movement of the support 24.

A rear support or spider 33, similar to the support 24, engages the rear or outer end of the shell 30. At the center of the spider 33 is a hub or ring 34 having an internal bore which has a substantial clearance with the shank 15. Extending outwardly from the hub 34 are radial spokes 35 which join a rim 36. The rim 36 and spokes 35 define a plurality of longitudinal vents 37, which cooperate with the perforations 31 and forward vents 28 for the circulation of air. The forward face of the rim 36 is cut to form an annular shoulder 38 which engages with the rear edge of the shell 30 and prevents any lateral or longitudinal movement thereof.

Extending through the hub 34 is a locking cap 40 which is internally threaded to engage with the shank thread 17 for axial adjustment along the shank 15. The forward portion of the cap 40 serves as a bushing to hold the hub 34 concentric with the shank 15, and on the outer end of the cap is an enlarged head 41 provided with a suitable tool drive socket 42. The head 41 bears firmly against the support 33, and as can be understood, tightening of the cap 40 cinches all of the elements together to form a rigid handle. Because of the tight frictional engagement with the forward support member, rotation of either the shell 30 or thumb rest 21, relative to the shank 15 is prevented.

The shell 30 and all of the other parts of the handle 10 may be made of suitable flame and corrosion resistant material such as a plated steel, and there is no damage done if the handle should accidentally contact open flames from the fire. Because of the possible direct flame contact, the parts may warp or change dimension, and any looseness so caused can be removed by adjustment of the cap 40. The small area of contact between the supports and shank restricts the conduction of heat into the gripping surface which consequently remains relatively cool. Because of the longitudinal and peripheral vent means, a continuous circulation of air through the handle is provided, and any heat present is rapidly dissipated.

After the tool has been used, the handle 10 is easily removed for cleaning by loosening the cap 40. As was previously mentioned, a hard grease and carbon coating may form on the handle, and its removal for cleaning is therefore highly desirable. Assembly of the device is equally simple, and the cap 40 may always be adjusted to eliminate slack due to wear or warping of the parts.

While I have shown and described in some detail a preferred form of handle which is economically manufactured and durably constructed, many modifications of design will be apparent to those skilled in the art, and I do not wish to be restricted except as defined in the appended claims.

I claim:
1. A detachable heat dissipating handle adapted for mounting on the shank of a utensil, and comprising: a fixed collar spaced from the rear end of said shank and having a rearwardly convergent conical face; a removable forward support slidably mounted on said shank and having a tapered internal surface to wedge nonrotatably against said collar, said forward support having a plurality of air vents therein outwardly of said collar; a shell-like grip member concentrically spaced from said shank and engaging said forward support, said member having a plurality of perforations therein; a removable rear support extending outwardly from said shank and engaging said grip member, said rear support having a plurality of air vents therein; and an adjustable cap threadedly engaging said rear support and said shank to force said support firmly against said grip member.

2. A detachable heat dissipating handle adapted for mounting on the shank of a utensil, and comprising: a fixed collar spaced from the rear end of said shank and having a rearwardly convergent tapered face; an offset thumb rest formed with a dished arcuate body portion disposed parallel to said shank and having a conically tapered sleeve slidably mounted on said shank and seated against said collar; a removable forward support slidably mounted on said shank and having a tapered forward face to bear firmly against said sleeve and hold the latter in frictional engagement with said collar, whereby to prevent rotation of said thumb rest, said forward support having a plurality of air vents therein outwardly of said sleeve; a shell-like grip member concentrically spaced from said shank and engaging said forward support, said member having a plurality of perforations therein; a removable rear support extending outwardly from said shank and engaging said grip member, said rear support having a plurality of air vents therein; and an adjustable cap threadedly engaging said shank, and formed with an enlarged head abutting said rear support to force the same firmly against said grip member.

3. A detachable heat dissipating handle adapted for mounting on the shank of a utensil, and comprising: a fixed collar spaced from the rear end of said shank and having a rearwardy convergent tapered face; an offset thumb rest formed with a dished arcuate body portion disposed parallel to said shank and having a conically tapered sleeve slidably mounted on said shank and seated against said collar; a removable forward support slidably mounted on said shank, said support having a tapered hub to bear firmly against said sleeve and hold the latter in frictional engagement with said collar whereby to prevent rotation of said thumb rest, said support having a plurality of radial spokes of minimum cross-sectional area extending from said hub and joining a peripheral rim, said spokes defining a plurality of longitudinal air vents, and said rim having a rear annular shoulder; a tubular grip member concentrically spaced from said shank and engaging said forward support, said member seating in said annular shoulder to prevent lateral movement of said member and rearward movement of said support, and said member having perforations throughout the surface thereof; a removable rear support having a hub loosely mounted on said shank and a plurality of spokes of minimum cross-sectional area extending from said hub and joining a peripheral rim, said spokes defining a plurality of longitudinal air vents which cooperate with said perforations and said forward air vents to allow a continuous air circulation, said rim having a forward annular shoulder engaging with said grip member; and an adjustable cap fitted within said rear support and threadedly engaging said shank, said cap being formed with an enlarged head abutting said support to force the same firmly against said grip member.

4. A detachable heat dissipating handle adapted for mounting on the shank of a utensil, and comprising: a fixed collar spaced from the rear end of said shank and having a rearwardly convergent tapered face; an offset thumb rest having a body portion disposed outwardly from said shank and a conically tapered sleeve slidably mounted on said shank and seated against said collar; a removable forward support slidably mounted on said shank and having a tapered forward face to bear firmly against said sleeve and hold the latter in frictional engagement with said collar whereby to prevent rotation of said thumb rest; a shell-like grip member concentrically spaced from said shank and engaging said forward support; a removable rear support extending outwardly from said shank and engaging said grip member; and an adjustable cap threadedly engaging said shank, and formed with an enlarged head abutting said rear support to force the same firmly against said grip member.

LUCIANO BACA.

References Cited in the file of this patent

UNITED STATES PATENTS

| Number | Name | Date |
|--------|------|------|
| 42,522 | Williams | Apr. 26, 1864 |

FOREIGN PATENTS

| Number | Country | Date |
|--------|---------|------|
| 631,602 | France | Dec. 23, 1927 |